US005942453A

United States Patent [19]

Di Loreto

[11] Patent Number: 5,942,453

[45] **Date of Patent: *Aug. 24, 1999**

[54] MIXTURE OF CHEMICALS FOR FORMING A REFRACTORY COMPOSITION

[75] Inventor: Oswaldo Di Loreto, Boussu, Belgium

[73] Assignee: FIB-Services, Boussu, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,663

[22] PCT Filed: Feb. 10, 1995

[86] PCT No.: PCT/BE95/00012

§ 371 Date: Sep. 10, 1996

§ 102(e) Date: Sep. 10, 1996

[87] PCT Pub. No.: WO95/26324

PCT Pub. Date: Oct. 5, 1995

[30] Foreign Application Priority Data

Mar. 25, 1994 [BE] Belgium ................................ 9400321

[51] Int. Cl.[6] ........................ C04B 35/03; C04B 35/101; C04B 35/16; C04B 35/44

[52] U.S. Cl. .......................... 501/87; 501/96.1; 501/108; 501/120; 501/121; 501/123; 501/125; 501/127; 501/133

[58] Field of Search .............................. 501/87, 96, 96.1, 501/108, 120, 121, 123, 125, 127, 133

[56] References Cited

U.S. PATENT DOCUMENTS 5,221,647 6/1993 Hida et al. ................................ 501/98

FOREIGN PATENT DOCUMENTS

| | | |
|---|---|---|
| 871496 | 2/1979 | Belgium . |
| 426848 | 5/1991 | European Pat. Off. . |
| 0577735 | 1/1994 | European Pat. Off. . |
| 2213812 | 8/1989 | United Kingdom . |
| WO 92/19566 | 11/1992 | WIPO . |

OTHER PUBLICATIONS

Sax et al., Hawley's Condensed Chemical Dictionary, pp. 120, 121, 207, 722 & 1099, 1984.

Encyclopedia of Chemical Technology, Third Edition, pp. 1–6, 1982.

Encyclopedia of Chemical Technology, Fourth Edition, pp. 202–210, 1996.

*Primary Examiner*—Mark L. Bell
*Assistant Examiner*—David Sample
*Attorney, Agent, or Firm*—Browdy and Neimark

[57] ABSTRACT

A powdered mixture of chemicals for forming a refractory composition, including a filler consisting of refractory particles, metal particles and metal peroxide containing particles, wherein the metal peroxide containing particles have a calcium peroxide content of at most 75 wt %, a magnesium peroxide content of at most 30 wt %, a barium peroxide content of at most 92 wt %, and/or a strontium peroxide content of at most 90 wt %. A refractory composition prepared from said mixture, a method for forming said composition and a method for using same are also disclosed.

28 Claims, 1 Drawing Sheet

8
7
5

MIXTURE OF CHEMICALS FOR FORMING A REFRACTORY COMPOSITION

FIELD OF THE INVENTION

The present invention concerns a mixture of chemical substances for forming a refractory composition that takes the form either of blocks or moulded parts or of refractory coatings, in particular a pulverulent mixture, comprising a charge of refractory particles, metallic particles and particles containing a metal peroxide.

More specifically, it concerns a mixture of inert refractory particles and of chemical substances which, by oxidation or decomposition, can form a mixed oxide in an exothermic manner, where said mixed oxide constitutes a binding phase for the charge of refractory particles.

BACKGROUND OF THE INVENTION

For the purpose of manufacturing refractory materials, Belgian patent 871.496 shows the use of oxides, oxidisable elements such as metals, and oxidising compounds, in particular metal peroxides with a particle size between 50 and 300 microns.

Similarly, in UK patent 2.213.812 with the same object, oxidising agents are used with an average particle size less than 200 microns and a maximum particle size of 500 microns, such as higher oxides, nitrates, perhalogenates or peroxides. Such peroxides are also mentioned in German patent application 4.221.480, as substances which can decompose.

Further, international patent application PCT/BE92/00012, submitted by the same applicant as for the present patent application, describes mixtures containing peroxides which enable refractory mixed oxides to be formed which play the role of a binding phase for refractory particles.

SUMMARY OF THE INVENTION

One of the essential aims of the present invention is to propose a mixture of chemical substances of the type mentioned above, offering significantly higher safety of use compared with the known mixtures of chemical substances.

Indeed, the combination of reducing agents, such as metallic elements, and oxidising agents, such as peroxides, can pose problems of stability and of controlling the reactions at various stages of production of the above-mentioned refractory composition.

For example, right from the preparation of the mixture of metallic particles and particles containing metal peroxide, forming the reducing and oxidising agents, it is necessary to avoid the presence of any compound which could trigger a violent catalytic reaction.

Further, when the pulverulent mixture thus obtained is suspended in a carrier gas for spraying, excessive transport speeds can also give rise to uncontrollable or even explosive decomposition.

Finally, during spraying, there is a risk of the combustion front propagating upstream towards the fuel source.

The mixture of chemical substances according to the invention is characterised by the fact that the particles containing metal peroxide have a calcium peroxide content of at most 75% by weight and preferably at most 65% by weight, a magnesium peroxide content of at most 30% by weight, a barium peroxide content of at most 92% by weight and/or strontium peroxide of at most 90% by weight.

The invention also concerns a refractory composition obtained from the above-mentioned mixture.

This composition comprises a charge of refractory particles immersed in a binding phase containing at least 20% and preferably more than 50% of at least one refractory mixed oxide with at least two different metals, said binder having a melting point lower than the refractory charge.

The invention further concerns a process for preparing a refractory composition by the application of the above-mentioned mixture.

According to this process, refractory oxides of different metals are first formed by oxidation reactions and/or decomposition reactions of chemical starter substances. These refractory oxides are formed in ratios such that, subsequently, a mixed refractory oxide is formed by reaction between at least 50% of said nascent refractory oxides, where said mixed refractory oxide is thermodynamically stable under the conditions of this reaction. The type and quantity of the chemical reagents are chosen such that said reactions are exothermic and lead to the formation of the mixed oxide in the molten state.

Finally, the invention concerns further a process for applying the above-mentioned mixture of chemical substances to a wall so as to form a refractory coating.

Said process is characterised by the fact that a mixture of said chemical substances is sprayed against said wall by bringing said mixture and the resulting refractory composition to a temperature higher than the melting temperature of the mixed oxide but lower than the melting temperature of the charge that it contains.

Other details and characteristics of the invention will be apparent from the following non-limitative description of some particular embodiments of the invention, with reference to among other things the attached drawings.

Figure 1:
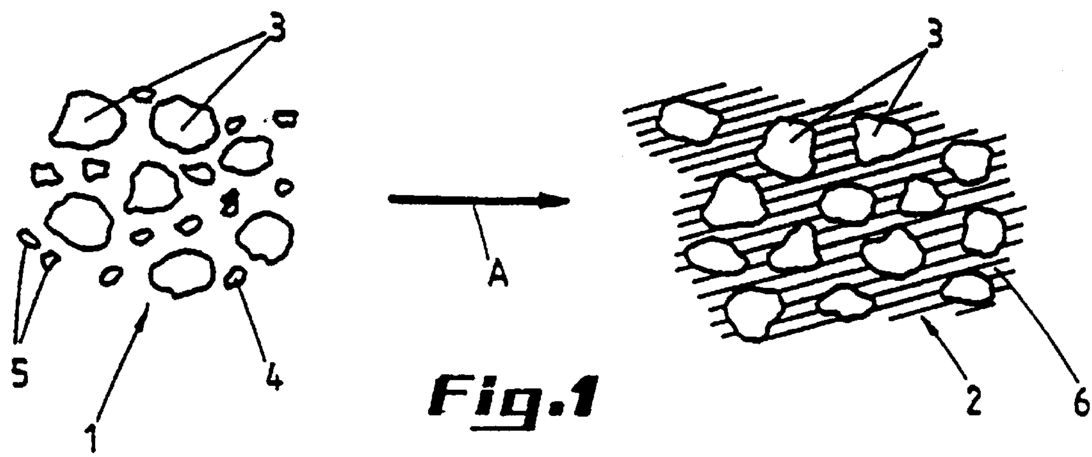
FIG. 1 is an enlarged schematic diagram of the transformation of the pulverulent mixture according to the invention into the structure of the refractory composition according to the invention.

In both figures, the same references refer to the same items.

DETAILED DESCRIPTION OF THE INVENTION

The invention is based on among other things the observation that the mass ratio of the reducing and oxidising agents, the state of division of said agents, such as the particle size, specific area and homogeneity of distribution of the agents in the mixture, the mode of pneumatic transport and the concentration of particles in the carrier gas do not constitute a sufficient set of parameters to ensure control of the spray process applied, and in particular to ensure the safety of the operators during spraying.

Indeed, in the course of spraying tests it has emerged in a quite unforeseeable way that the activity of the oxidising agent, no mention of which has been made in the prior literature and in particular in the above-mentioned publications, plays a fundamental role in the safety of handling of the pulverulent mixture used to form a coating by hot spraying.

In this regard, it has been determined that for the same particle size distribution, the activity of a particular oxidising agent is determined by its concentration in the particles of which it forms part; moreover, the maximum permissible value of this concentration itself depends on the nature of the oxidising agent.

According to the invention, it has been determined that a mixture of chemical substances for forming a refractory composition, comprising a charge of refractory particles, metallic particles and particles with a calcium peroxide concentration of at most 75% by weight and preferably at most 65% by weight, a magnesium peroxide concentration of at most 30% by weight, a barium peroxide concentration of at most 92% by weight and/or a strontium peroxide concentration of at most 90% by weight, gives full satisfaction from the point of view of safety, while permitting perfect control of the process for formation of a refractory composition with the desired properties for the application envisaged.

It has been determined that said composition presents excellent properties, both refractory and mechanical, such as wear resistance and adhesion to surfaces to be covered when the composition is in the form of a coating.

According to the invention, the mixture of chemical substances can advantageously comprise particles of at least one of the following metals: Al, Si, Mg, Fe, Cr, Ca, Ba, Sr, Zr, Ti and Be, either in distinct form or in the form of technically feasible alloys of these metals, while the refractory charge in this mixture comprises at least one of the oxides, carbides and/or nitrides of the following metals: Si, Al, Zr, Ca, Mg, Ti and Cr, in particular in one or other of their mineralogical varieties and/or in mixed forms such as oxy-nitrides, oxy-carbides or carbo-nitrides. This mixture also contains a component or components such as peroxides, chloride and/or carbides which form refractory oxides by exothermic oxidation and/or decomposition reaction. The oxides can combine starting from their molten state to form a mixed oxide, such as defined in international patent application PCT/BE92/00012, in which crystallisation takes place at the end of the formation reaction. The above-mentioned chlorides and carbides can be aluminium chloride, silicon chloride, aluminium carbide or silicon carbide. By extension, they may be any other salt of the above-mentioned metals which is unstable at the temperature at which the mixture of chemical substances is brought in order to form the refractory composition.

In the refractory charge, the oxides, carbides and nitrides of the above-mentioned metals may be in different mineralogical varieties, such as tridymite, cristobalite and silica glass in the case of silicon oxide, or in mixed forms of said metals, such as oxy-nitrides, oxy-carbides, carbo-nitrides etc. which possess interesting refractory properties.

In general, the content of refractory charge in the pulverulent mixture according to the invention is between 0 and 90% of said mixture by weight.

In a preferred embodiment of the invention, the content of refractory charge in the mixture is from 20% to 85% by weight, and preferably from 50% to 85% by weight with respect to the total weight of the mixture, while the particles comprising the mixture possess an average diameter between 200 and 800 microns with a maximum diameter of 1 mm, the particle size distribution of the charge furthermore closely approaching that laid down by Andreassen's principle.

Regarding the above-mentioned metallic particles, these advantageously have a particle size distribution of between 10 and 30 microns, while the size distribution of the particles containing peroxide is advantageously between 5 and 30 microns.

Further, it has been determined that good results are obtained when the ratio of the different constituents in the mixture is chosen so as to permit the formation of a refractory composition comprising a charge of refractory particles immersed in a binding phase having a melting point lower than that of said charge and containing at least 20% and preferably more than 50% of at least one refractory mixed oxide with at least two different metals.

The term "mixed oxide" is, in the context of the present invention, understood to mean a crystallised chemical compound formed from at least two oxides of different metals.

According to the invention, by a judicious choice of the binding phase, which generally essentially comprises one or more well-determined mixed oxides, it is possible to obtain a very wide variety of refractory compositions, thus permitting a great diversity of applications.

In fact, starting from the numerous binary and ternary phase diagrams existing in the scientific literature, it is possible to draw up a list of numerous binary, ternary etc. mixed refractory oxides which are thermodynamically stable at the desired application temperature and which are resistant to the thermal, chemical and mechanical conditions required for the application envisaged.

Thus, by selecting the type and number of refractory oxides comprising the charge, a great variety of new, composite refractory compositions can be synthesised according to the invention.

The properties of the refractory masses thus obtained depend on the proportion and particle size distribution of the charge, as well as on its nature, in particular by playing the role of heat absorbant, thus making it possible to regulate the kinetics of the chemical reactions.

In order to prepare the refractory composition according to the invention, refractory oxides are first formed in situ by oxidation and/or decomposition of at least two chemical substances which are initially different, said substances being chosen such that and being in ratios such that, subsequently, a mixed refractory oxide can be formed by reaction between the highly reactive nascent refractory oxides, where said refractory mixed oxide is thermodynamically stable under the conditions of said reaction.

The nature and quantity of the reacting chemical substances are such that their oxidation and synthesis reactions are exothermic and lead to melting of the mixed oxide thus formed, so forming the binding phase of the refractory composition obtained, after cooling and crystallisation.

In this way, any chemical substance which leads to formation of a refractory oxide after oxidation and/or decomposition may be used for synthesising the refractory mixed oxide.

In certain particular cases, the substances for initially forming the refractory oxides may be composed of one or more metallic compounds in the liquid or gaseous state.

Further, the mass distribution of the powders used to form the refractory composition according to the invention must be such that it promotes the formation of the desired mixed oxide. Experience has shown that the mass ratio of the nascent oxides at the moment of the first decomposition and/or oxidation reactions must preferably be between 0.5 and 2 times the stoichiometric ratio of the mixed oxide to be synthesised. During formation of the refractory oxides, the reaction temperature is advantageously kept 50° to 200° C. higher than the melting point of the mixed oxide to be synthesised.

Control of the temperature of the reaction depends on the total energy balance of the successive reactions, and can be ensured by the judicious choice of a ratio between the reacting substances and the charge. Said ratio can vary enormously, depending on the nature and particle size distribution of the charge, and on the surrounding heat conditions, according to the application and the conditions under which the process is used; in this way, the same compound can be synthesised under particular conditions or at high temperature, for producing shaped parts or for repairing structures in operation respectively, and thus for producing or repairing furnace walls at relatively high temperature.

Due to the fact that the maximum content of peroxide in the corresponding particles of the mixture according to the invention is limited, for the sake of reliable spraying of the mixture and in order to guarantee the stoichiometry of the mixed oxide, the oxygen content of the carrier gas used is adjusted according to the quantity of nascent oxygen that can be supplied by decomposition of the peroxide of the metal element M in the reaction $MO_2 \rightarrow MO+O$.

According to the invention, the peroxide-containing particles used in the mixture according to the invention generally also contain, in addition to the peroxide, the oxide of the base used for formation of the peroxide in question, together with decomposition compounds such as the hydroxide and carbonate of the metal of the peroxide.

Depending on the choice of constituents of the mixture and the relative ratio of the latter, the refractory composition obtained from said mixture comprises a mixed oxide composed of pseudowollastonite, $12CaO.7Al_2O_3$, $CaO.Al_2O_3$, $CaO.2Al_2O_3$, diopside, ackermanite, monticellite and/or merwinite.

FIG. 1 shows, in an entirely schematic way and on a greatly enlarged scale, the transformation of the structure of the refractory mixture 1 according to the invention, together with the compact structure of a coherent refractory composition 2. The arrow A indicates the transition from the pulverulent mixture 1 to the coherent composition 2.

The mixture is composed of particles 3 of an inert refractory charge with an average diameter varying from 200 to 800 microns, with a maximum diameter of 1 mm, and of metallic particles 4 with an average diameter varying from 10 to 30 microns, and of peroxide-containing particles 5 with an average diameter varying from 5 to 30 microns. Said pulverulent mixture 1 is converted to a refractory composition 2 by oxidation reactions of the metal elements of the particles 4, and by decomposition of the peroxides contained in the particles 5, so as to form, in an intermediate step, refractory oxides of different metals which then react with each other to form mixed oxides forming a binding phase 6 for the particles 3 of the inert refractory charge, as illustrated by the right-hand portion of FIG. 1.

Figure 2:
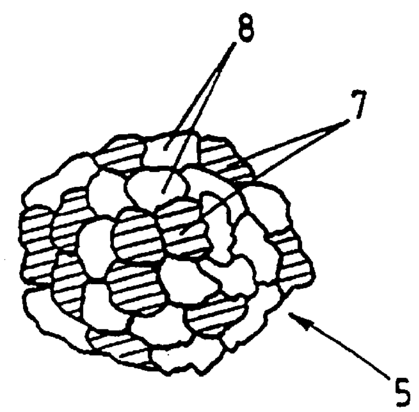
FIG. 2 is an enlarged schematic diagram of a particle containing metal peroxide.

FIG. 2 shows, also very schematically and on an even greater scale, a particle 5 containing metallic peroxide.

This peroxide is generally obtained in an industrial process by reaction, in solution, of the oxide of a metal with hydrogen peroxide, with secondary formation of the carbonate and hydroxide of said metal as decomposition products.

Such a peroxide-containing particle is formed by co-precipitation and co-crystallisation of metal peroxide with the unreacted basic oxide, the carbonate and the hydroxide.

This accordingly makes it possible to obtain particles comprising crystals of peroxide 7 agglomerated with crystals 8 of the basic oxide, carbonate and hydroxide.

It is supposed that the safety and stability of the reactions for formation of the refractory composition 2 result from the fact that the peroxide crystals 7 decompose gradually, releasing nascent oxygen and reacting gradually to form mixed oxides, such that the concentration of reactive peroxide always remains very low, both in the mixture and in the refractory composition in the course of being formed.

Below are some specific examples of embodiments of the invention, showing more clearly the principle of the invention, along with various other features and additional characteristics of the same.

EXAMPLE 1

This example concerns the manufacture or repair of siliceous refractory products such as those used in coking ovens.

The refractory composition, according to the invention, comprises particles of a refractory charge of silica with an average diameter of 300 microns, converted to cristobalite+tridymite. Said particles are enveloped by a binding phase essentially comprising pseudowollastonite $CaSiO_3$. The raw materials used for synthesising said binding phase are: particles of metallic silicon with an average diameter of 20 microns, and particles containing calcium peroxide with an average diameter of 10 microns. For the reasons of stability mentioned above, the peroxide-containing particles used have a maximum peroxide content of less than 75% by weight and preferably less than 65% by weight.

In order to form said refractory composition, the mixture used contained: 75% by weight of silica particles, 13% by weight of silicon particles and 12% by weight of particles containing 62% calcium peroxide.

EXAMPLE 2

This example relates to magnesia based refractory substances such as those used in steel converters.

In the refractory composition of said substances, the binding phase is the spinel type $MgO.Al_2O_3$, which is synthesised from aluminium powder with an average diameter of 20 microns and from particles based on magnesium peroxide with an average diameter of 18 microns, in which the maximum content of peroxide is limited to 30% by weight.

The charge contained in this composition is formed of magnesium oxide granules, either sintered or electromelted, with an average diameter of 400 microns.

The mixture used to form said composition comprised 76.4% by weight of MgO, 12.2% by weight of particles containing 26% $MgO_2$, and 11.4% by weight of aluminium particles.

In view of the lower amount of nascent oxygen supplied by the peroxide, the carrier gas used for spraying the mixture was enriched to 80% oxygen.

EXAMPLE 3

This example concerns aluminous refractory substances for which a binding phase of the type $BaO.Al_2O_3$ has been chosen.

The mixture used thus contains particles based on barium peroxide possessing greater chemical stability than calcium peroxide and magnesium peroxide, so that the peroxide concentration of said particles can be up to 92% by weight.

The mixture of particles used for creating such a refractory composition comprised 20.4% by weight of particles with an average diameter of 15 microns, containing 90% barium peroxide, 9.6% by weight of aluminium particles, and 70% by weight of corundum particles with a particle size of less than one millimeter.

EXAMPLE 4

In this example, the binding phase comprises the mixed oxide MgO—SrO which is highly refractory, having a eutectic temperature in the region of 2000° C. In this composition the refractory charge is formed of magnesia and/or dolomite.

The mixture for forming said refractory composition comprises 68.5% by weight of particles of MgO with a diameter of less than 1 mm, 7.5% by weight of Mg particles with an average diameter of 15 microns and 24% by weight of particles containing 86% $SrO_2$ with an average diameter of 18 microns.

It goes without saying that the invention is not limited to the various embodiments described above; on the contrary, many embodiments may be envisaged while still remaining within the scope of the invention. For example, in certain cases the concentration of peroxide in the corresponding particles of the mixture may be extremely low.

I claim:

1. A pulverulent mixture of chemical substances comprising, as constituents, a charge of refractory particles, metallic particles, and metal peroxide-containing particles, the ratio of the constituents in said mixture being capable of forming a refractory composition comprising said charge immersed in a binding phase having a melting point lower than the melting point of said charge and containing at least 20% of at least one refractory mixed oxide of at least two different metals, wherein said metallic particles have an average diameter varying from 10 to 30 microns and said metal peroxide containing particles have an average diameter of between 2 and 20 microns;

wherein said metal peroxide-containing particles are agglomerated with crystals of oxides, carbonates, or hydroxides of said metals;

wherein said charge of refractory particles forms between 50% and 90% by weight with respect to the total weight of the mixture and the refractory particles have an average diameter between 200 and 800 microns with a maximum diameter of 1 mm;

wherein the particles containing metal peroxide have a calcium peroxide concentration of not more than 75% by weight, and a magnesium peroxide concentration of not more than 30% by weight.

2. The pulverulent mixture according to claim 1 wherein the metallic particles are formed essentially of silicon and the metal peroxide particles comprise calcium peroxide.

3. The pulverulent mixture according to claim 1 wherein the metallic particles are formed essentially of aluminum and metal peroxide particles containing magnesium peroxide.

4. The pulverulent mixture according to claim 1 comprising metallic particles formed essentially of aluminum and metal peroxide particles containing barium peroxide.

5. The pulverulent mixture according to claim 1 comprising metallic particles formed essentially of magnesium and metal peroxide particles containing strontium peroxide.

6. The pulverulent mixture according to claim 1 comprising metallic particles of at least two of the following metals: Al, Si, Mg, Fe, Cr, Ca, Ba, Sr, Zr, Ti, Be, either in the form of the free metal or in the form of alloys of these metals.

7. The pulverulent mixture according to claim 1 wherein said charge of refractory particles comprises at least one of the oxides, carbides, and nitrides of the following metals: Al, Si, Zr, Ca, Mg, Ti, Cr, in any of their mineralogical varieties or in mixed forms of oxy-nitrides, oxy-carbides, or carbonitrides.

8. The pulverulent mixture according to claim 1, which comprises at least one metal compound that can form a refractory oxide by decomposition and/or oxidation.

9. The pulverulent mixture according to claim 1 wherein the concentration of said charge of refractory particles is up to 85% by weight with respect to the total weight of the pulverulent mixture.

10. The pulverulent mixture according to claim 1 wherein the size distribution of the charge of refractory particles is substantially that of Andreasen's principle.

11. The pulverulent mixture according to claim 1, wherein the ratio of said constituents provides a binding phase containing a refractory mixed oxide comprising pseudowollastonite.

12. The pulverulent mixture according to claim 1, wherein the ratio of said constituents provides a binding phase containing a refractory mixed oxide comprising a member selected from the group consisting of $12CaO.7Al_2O_3$, $CaO.Al_2O_3$, $CaO.2Al_2O_3$, $MgO.Al_2O_3$, solid solutions of the binary system MgO.SrO, and mixtures thereof.

13. The pulverulent mixture according to claim 1, wherein the ratio of said constituents provides a binding phase containing a refractory mixed oxide comprising diopside, ackermanite, monticellite, and/or merwinite.

14. The pulverulent mixture according to claim 1, wherein the ratio of said constituents provides a binding phase containing a refractory mixed oxide comprising $BaO.SiO_2$ and/or $BaO.Al_2O_3$.

15. Process for preparing a refractory composition, employing the pulverulent mixture according to claim 1, wherein refractory oxides of different metals are initially formed by oxidation and/or decomposition reactions of at least a portion of the pulverulent mixture, in ratios such as to subsequently form a refractory mixed oxide by reaction of at least 50% of said refractory oxides, said refractory mixed oxide being thermodynamically stable under the conditions of said reaction, the nature and quantity of the pulverulent mixture being chosen such that said reactions are exothermic and lead to the formation of the mixed oxide in the molten state.

16. The process according to claim 15, wherein in order to initially form the refractory oxides, one or more metallic compounds in a state selected from the liquid state, the gaseous state and mixtures thereof are used.

17. Process according to claim 15, wherein the quantities and nature of the metallic particles and the peroxide-containing particles reacted to initially form the refractory oxides are regulated such that the mass ratio of the refractory oxides is between 0.5 and 2 times the stoichiometric ratio of the oxides constituting the refractory mixed oxide to subsequently be formed.

18. Process according to claim 15, wherein the temperature during formation of said refractory oxides is kept 50° C. to 200° C. higher than the melting temperature of the refractory mixed oxide to be formed.

19. Process according to claim 15, wherein the temperature during the formation of the refractory oxides is regulated by adjusting the quantity and particle size distribution of the charge of refractory particles in the pulverulent mixture.

20. Process according to claim 15, wherein the reactions for formation of the refractory oxides are primed by means of an external heat source, and in that the temperature of said reactions is regulated taking into account the initial temperature of the system.

21. Process according to claim 15, wherein the quantities and nature of the metallic particles and the peroxide-containing particles which are reacted are regulated to form said refractory mixed oxide which is made up of diopside, monticellite and/or merwinite.

22. Process according to claim 15, wherein the quantities and nature of the metallic particles and the peroxide-containing particles which are reacted are regulated to form said refractory mixed oxide which is made up of $12CaO.7Al_2O_3$, $CaO.Al_2O_3$, and/or $CaO.2Al_2O_3$.

23. Process according to claim 15, wherein the quantities and nature of the metallic particles and the peroxide-containing particles which are reacted are regulated to form said refractory mixed oxide which is made up of compounds selected from the group consisting of $BaO.SiO_2$, $BaO.Al_2O_3$ and mixtures thereof.

24. Process according to claim 15 wherein the particle size and concentration of said metal peroxide containing particles substantially prevents explosion.

25. Process for applying to a wall the pulverulent mixture according to claim 1 so as to form a refractory coating, comprising spraying said pulverulent mixture against the wall while bringing said pulverulent mixture, and the refractory composition resulting from it, to a temperature higher than the melting temperature of the refractory mixed oxide but lower than that of the charge of refractory particles.

26. Process according to claim 25, wherein carrier gas is used to spray said pulverulent mixture, said carrier gas containing at least 21% oxygen.

27. Process according to claim 25, wherein at least part of the heat necessary for bringing said pulverulent mixture to said temperature before said pulverulent mixture reaches the wall and forms in situ the refractory composition is contributed from outside.

28. Process according to claim 25, wherein the refractory mixed oxide is formed in situ during spraying.

* * * * *